Feb. 15, 1966   N. P. S. STRAUSSLER   3,234,990
VEHICLE WHEEL
Filed March 2, 1964
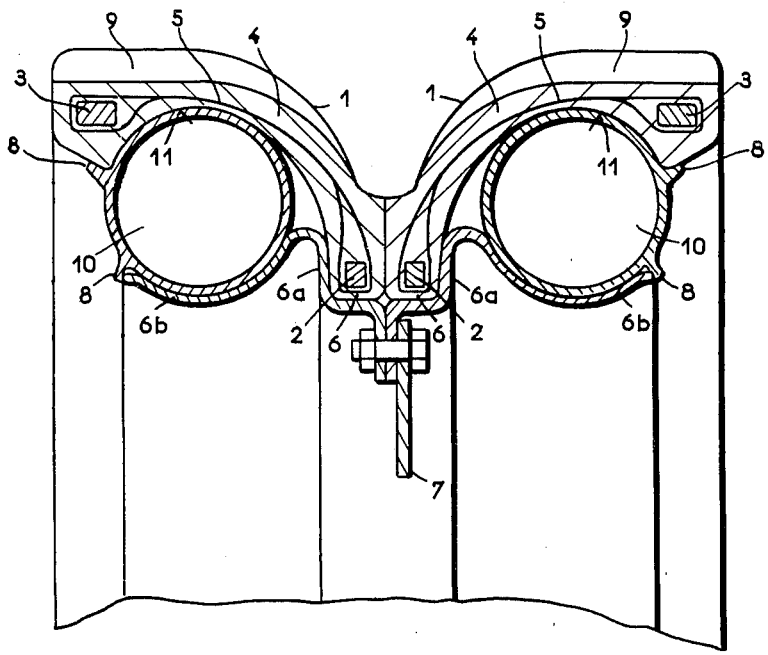
INVENTOR
NICHOLAS PETER SORRELL STRAUSSLER
BY
ATTORNEYS United States Patent Office 3,234,990
Patented Feb. 15, 1966

3,234,990
VEHICLE WHEEL
Nicholas Peter Sorrell Straussler, 5 Clarges St.,
London, England
Filed Mar. 2, 1964, Ser. No. 348,472
Claims priority, application Great Britain, Mar. 1, 1963,
8,229/63
4 Claims. (Cl. 152—340)

The invention relates to an extension of my co-pending patent application Serial No. 300,801 filed August 8, 1963, now Patent No. 3,163,199 granted December 29, 1964, in which a tire carcass of the non-pneumatic kind is in the shape of a deep dish and is made of a flexible material, such as rubber, which may be suitably reinforced. The centre portion of the base of the said dish is cut to receive the circular flanged wheel rim to which it is suitably fastened. The outer free edge of the dished carcass is reinforced by a ring or rings of spring steel material or the like or closed coiled or fairly close coiled helical spring or springs which may extend into the body of the dish shaped carcass.

An embodiment of the invention is illustrated by way of example in the accompanying diagrammatic drawing, which shows a fragmentary sectional view of a vehicle wheel according to the invention.

Two dish shaped tires 1 including a carcass 4 are arranged back to back on a rim 7 having two flanged seats clamped together to enclose the beads of the tires which latter may also be formed as a unitary structure. The tires are made from rubber or rubber compounds or any suitable resilient synthetic material.

In this invention the wheel rim in the centre portion 6a which encloses the bead seat 6 of the dished carcass 4 is axially extended in such a manner that it has a substantially circular concave portion 6b in its outward formation. The deeply dished tire carcass is also concavely shaped at 11 for a substantial axial distance; thus between the rim extension 6b and the inner surface of the carcass 4 a toroidal space of substantially circular cross section is formed into which a hollow annular tube 10 made of flexible but substantially non-extensible material may be introduced. This annular tube, when inflated, will carry the load applied between the rim 6a and the running surface 9. The carcass is reinforced with an annular metallic or similar ring or rings of spring like characteristics 3 at its outer edge and flexible reinforcing materials, commonly used in the construction of tire bodies as indicated at 5, embraces the said annular ring, rings or helical spring 3 and the bead core ring 2 of the bead seat 6. The annular pneumatic tube may be provided with projections or flanges 8 in order to prevent the ingress of dirt or other material between the inflatable annular tube and its embracing surfaces.

The intention of the invention is to provide a tire in which a portion of the load is carried by the dished carcass and a further portion by the pneumatically inflated tube 10. In case of a puncture causing a deflation or loss of pressure in the air space of the pneumatic tube the entire load is carried by the dished carcass 4 which is in contact with the road at its running surface 9, the load being carried principally by the metallic reinforcement 3 transmitting the load by means of the carcass from the rim 6a to the running surface 9. The pneumatic tube 10 in such cases may be easily replaced without lifting the vehicle or demounting the tire. This combined device carrying the load in a pneumatic and a non-pneumatic manner may consist of a single tire or a double or twin tire equipment as is illustrated.

What I claim is:

1. A vehicle wheel comprising a tire having a carcass in the shape of a deep dish whose outer surface is concave and whose base is cut out and suitably reinforced to form a bead for enclosure, the outer edge of said carcass being free and suitably reinforced by at least one metallic spring ring member enclosed therein, a flanged rim enclosing said bead of the dished carcass and extended axially to form part of a concave annular ring providing a toroidal space of substantially circular section between itself and the said outer concave surface of the dished carcass, and a pneumatic tube introduced into said toroidal space to act as partial load carrier between the metallic rim partially embracing its inner surface and the dished carcass partially embracing its outer surface.

2. A vehicle wheel as claimed in claim 1, in which said pneumatic tube is provided with protrusions in close contact with edge portions of said rim and the dished shape carcass to prevent the ingress of foreign material between the surfaces of the said pneumatic tube and the embracing surfaces of the rim and of the dished carcass.

3. A vehicle wheel as claimed in claim 1, in which said pneumatic tube is a hollow annular flexible but substantially non-extensible tube which may be suitably inflated by air pressure.

4. A vehicle wheel as claimed in claim 1, in which two tires each having a deep-dished carcass are arranged on the rim with their beads arranged back to back, said rim having two flanges oppositely disposed and a pair of pneumatic tubes positioned in the spaces between said flanges and said two carcasses.

References Cited by the Examiner
UNITED STATES PATENTS 1,214,137  1/1917  Clawson _____ 152—301
1,229,264  6/1917  Hensley _____ 152—340

ARTHUR L. LA POINT, *Primary Examiner.*

C. W. HAEFELE, *Assistant Examiner.*